US012680672B1

(12) United States Patent
Sun

(10) Patent No.: US 12,680,672 B1
(45) Date of Patent: Jul. 14, 2026

(54) ILLUMINATION ANGLE ADJUSTMENT STRUCTURE AND LUMINAIRE WITH ADJUSTABLE ILLUMINATION ANGLE

(71) Applicant: Guangdong Qi Ke Electronics Co., Ltd., Jiangmen (CN)

(72) Inventor: Yihua Sun, Jiangmen (CN)

(73) Assignee: Guangdong Qi Ke Electronics Co., Ltd. (CN)

(*) Notice: Subject to any disclaimer, the term of this patent is extended or adjusted under 35 U.S.C. 154(b) by 0 days.

(21) Appl. No.: 19/262,144

(22) Filed: Jul. 8, 2025

(30) Foreign Application Priority Data

Feb. 25, 2025 (CN) ......................... 202510214350.6

(51) Int. Cl.

| | |
|---|---|
| ***F21V 14/06*** | (2006.01) |
| ***F21V 15/01*** | (2006.01) |
| ***F21V 17/02*** | (2006.01) |

(52) U.S. Cl.

CPC .............. *F21V 14/06* (2013.01); *F21V 15/01* (2013.01); *F21V 17/02* (2013.01)

(58) Field of Classification Search

CPC ........... F21V 14/06; F21V 15/01; F21V 17/02

See application file for complete search history.

(56) References Cited

U.S. PATENT DOCUMENTS

| | | | | |
|---|---|---|---|---|
| 4,840,083 A * | 6/1989 | Hagan | F16D 7/002 74/531 |
| 6,371,628 B1 * | 4/2002 | Ward | F21V 21/30 362/427 |
| 2022/0042659 A1 * | 2/2022 | Lin | F21K 9/65 |
| 2023/0119510 A1 * | 4/2023 | Feng | G06F 1/1684 |

FOREIGN PATENT DOCUMENTS

| | | | | |
|---|---|---|---|---|
| KR | 101815218 B1 * | 1/2018 | F21V 17/105 |
| KR | 101834532 B1 * | 3/2018 | F21V 21/14 |
| WO | WO-2024048307 A1 * | 3/2024 | F21S 2/00 |

OTHER PUBLICATIONS

English Machine Translation of WO-2024048307 provided by ESPACENET (Year: 2024).*

* cited by examiner

*Primary Examiner* — Zheng Song

(74) *Attorney, Agent, or Firm* — OPENPTO US LLC; Yuhao Liang

(57) ABSTRACT

The invention provides an illumination angle adjustment structure and a luminaire with adjustable illumination angle. The illumination angle adjustment structure comprises a point contact member; the point contact member is disposed around a peripheral wall of the optical module and connected to the optical module; the point contact member and the optical module are accommodated in the lamp housing; the point contact member abuts against an inner wall of the lamp housing via point contact; and a side of the point contact member away from the optical module is rollably connected to the inner wall of the lamp housing in any direction, enabling the optical module to rotate relative to the lamp housing to alter an exit direction of the light passing through the optical module. The illumination angle adjustment structure improves the convenience of the illumination angle adjustment of the luminaire with adjustable illumination angle.

15 Claims, 9 Drawing Sheets

(a) (b) (c) (d)

ILLUMINATION ANGLE ADJUSTMENT STRUCTURE AND LUMINAIRE WITH ADJUSTABLE ILLUMINATION ANGLE

TECHNICAL FIELD

The present invention relates to the technical field of lighting, and more particularly to an illumination angle adjustment structure and a luminaire with adjustable illumination angle.

BACKGROUND

A luminaire with adjustable illumination angle refers to a luminaire designed to allow users to adjust the illumination angle as needed. This design enables the luminaire to adapt to diverse lighting requirements, enhancing flexibility and comfort of use. With continuous innovation in luminaire design, omnidirectionally adjustable luminaires have emerged. These luminaires permit 360-degree adjustment of the illumination angle, significantly improving operational flexibility. As exemplified in Chinese Patent Application No. CN202310312501.2, such designs enable rotation of the light-transmitting component relative to the mounting component. The mounting component rotates relative to the lamp housing, restricting the rotation direction of the light-transmitting component driven by the mounting component to be different from the rotation direction of the light-transmitting component itself. In this way, the independent rotation of the light-transmitting component in two directions is achieved, and the 360-degree rotation of the optical lens can be better achieved. Further, the light emitted by the light source is deflected through the optical lens, realizing the 360-degree adjustment of the illumination angle of the luminaire. However, it still has the following problems.

Firstly, adjustment of the illumination angle of the luminaire by 360 degrees requires rotation in two directions, resulting in poor operational convenience.

Secondly, during rotation, surface contact is maintained between relatively moving components, leading to suboptimal rotational smoothness.

Accordingly, the operational convenience and rotational smoothness of illumination angle adjustment in luminaires remain to be enhanced.

SUMMARY

An object of the present invention is to overcome the deficiencies in the prior art and provide an illumination angle adjustment structure and a luminaire with adjustable illumination angle, significantly enhancing operational convenience and rotational smoothness in adjustment of illumination angle.

The object is achieved through the following technical solutions:

An illumination angle adjustment structure for assembling an optical module on a lamp housing, enabling light emitted from the light source module to enter the optical module, wherein the illumination angle adjustment structure comprises a point contact member;

the point contact member is disposed around a peripheral wall of the optical module and connected to the optical module; the point contact member and the optical module are accommodated in the lamp housing; the point contact member abuts against an inner wall of the lamp housing via point contact; and a side of the point contact member away from the optical module is rollably connected to the inner wall of the lamp housing in any direction, enabling the optical module to rotate relative to the lamp housing to alter an exit direction of the light passing through the optical module.

In one embodiment, at least one annular spherical surface is provided on the inner wall of the lamp housing; the point contact member abuts against the annular spherical surface via point contact, and the side of the point contact member away from the optical module is rollably connected to the annular spherical surface in any direction, enabling the optical module to rotate relative to the lamp housing.

In one embodiment, a plurality of annular spherical surfaces are provided on the inner wall of the lamp housing, the plurality of annular spherical surfaces being linearly arranged; the point contact member abuts against any one of the annular spherical surfaces via point contact; and the side of the point contact member away from the optical module is rollably connected to any one of the annular spherical surfaces in any direction, enabling the optical module to rotate relative to the lamp housing.

In one embodiment, a cylindrical inner wall is provided on the inner wall of the lamp housing; the point contact member abuts against the cylindrical inner wall via point contact; and the side of the point contact member away from the optical module is rollably connected to the cylindrical inner wall in any direction, enabling the optical module to rotate relative to the lamp housing.

In one embodiment, damping protrusions are provided on the inner wall of the lamp housing; and the point contact member abuts against the damping protrusions via point contact.

In one embodiment, the damping protrusions are grid-shaped protrusions; and/or the damping protrusions are silicone protrusions.

In one embodiment, the point contact member comprises at least three rolling components, the three rolling components being arranged around the peripheral wall of the optical module; each rolling component is connected to the optical module, accommodated in the lamp housing, and abuts against the inner wall of the lamp housing via point contact; and sides of the three rolling components away from the optical module are independently rollably connected to the inner wall of the lamp housing in any direction, enabling the optical module to rotate relative to the lamp housing.

In one embodiment, the point contact member comprises four rolling components arranged around the peripheral wall of the optical module; each rolling component is connected to the optical module, accommodated in the lamp housing, and abuts against the inner wall of the lamp housing via point contact; and sides of the four rolling components away from the optical module are independently rollably connected to the inner wall of the lamp housing in any direction, enabling the optical module to rotate relative to the lamp housing.

In one embodiment, each rolling component comprises a carrier and a spherical roller; the carrier is configured to connect to the optical module; the spherical roller is rollably connected to a side of the carrier away from the optical module; and the side of the spherical roller away from the carrier abuts against the inner wall of the lamp housing via point contact; the carrier of each rolling component is independently rollably connected to the inner wall of the lamp housing in any direction via the spherical roller.

In one embodiment, a rolling groove is provided on the side of the carrier away from the optical module; and the spherical roller is snapped into the rolling groove and rollably connected to the carrier.

In one embodiment, each rolling component comprises a telescoping member; one end of the telescoping member is connected to a side of the carrier proximate to the optical module, and the other end of the telescoping member is connected to a side of the optical module proximate to the carrier; and the telescoping member is configured to generate an elastic force to press the spherical roller against the inner wall of the lamp housing.

In one embodiment, each rolling component comprises a guiding member connected to the peripheral wall of the optical module; the side of the spherical roller away from the carrier at least partially protrudes beyond the guiding member;

the carrier is slidably coupled to the guiding member; an end of the telescoping member proximate to the optical module is connected to the optical module via the guiding member; and the guiding member is configured to permit telescopic motion of the telescoping member, enabling the spherical roller to slide relative to the guiding member toward or away from the optical module.

In one embodiment, the guiding member of each rolling component is provided with a sliding slot extending in a direction parallel to a lengthwise direction of the telescoping member; the telescoping member is accommodated within the sliding slot; the carrier is at least partially snapped into the sliding slot and slidably connected to walls of the sliding slot; and both ends of the telescoping member respectively abut against a base of the sliding slot and the side of the carrier proximate to the optical module.

In one embodiment, the guiding member of each rolling component comprises a mount base and a telescopic sliding sleeve, the mount base is connected to the peripheral wall of the optical module, the telescopic sliding sleeve is slidably coupled to the mount base and telescopically movable relative thereto; a sliding direction of the mount base is parallel to the lengthwise direction of the telescoping member; the telescopic sliding sleeve at least partially protrudes beyond a side of the mount base away from the optical module; the spherical roller at least partially protrudes beyond the telescopic sliding sleeve;

the end of the telescoping member proximate to the optical module is connected to the optical module via the mount base; both the mount base and the telescopic sliding sleeve are configured to permit telescopic motion of the telescoping member;

when the telescoping member is telescopically disposed within the mount base, the carrier is slidably connected to the mount base; and when the telescoping member is telescopically disposed within both the mount base and the telescopic sliding sleeve, the carrier slides away from the mount base, engages with the telescopic sliding sleeve, and drives the telescopic sliding sleeve to slide away from the optical module.

In one embodiment, a first stopper protrudes from an outer wall at the side of the mount base away from the optical module; a second stopper protrudes from an inner wall at a side of the telescopic sliding sleeve proximate to the optical module; when the telescoping member is telescopically disposed within both the mount base and the telescopic sliding sleeve, the carrier drives the telescopic sliding sleeve to slide away from the optical module until a side of the first stopper proximate to the optical module abuts against a side of the second stopper away from the optical module; and/or a third stopper protrudes from an outer wall at the side of the carrier proximate to the optical module; a fourth stopper protrudes from the inner wall at a side of the telescopic sliding sleeve away from the optical module; when the telescoping member is telescopically disposed within both the mount base and the telescopic sliding sleeve, a side of the third stopper away from the optical module abuts against a side of the fourth stopper proximate to the optical module.

In one embodiment, the elastic force generated by the telescoping member of at least one rolling component differs from that generated by the telescoping members of the remaining rolling components;

a cylindrical inner wall is provided on the inner wall of the lamp housing; the spherical roller abuts against the cylindrical inner wall via point contact; and the side of the spherical roller away from the carrier is rollably connected to the cylindrical inner wall in any direction, enabling the optical module to rotate relative to the lamp housing.

A luminaire with adjustable illumination angle, comprising a lamp housing, a light source module, an optical module, and the illumination angle adjustment structure;

wherein the light source module is disposed within the lamp housing;

the point contact member is disposed around a peripheral wall of the optical module and connected to the optical module, and both the point contact member and the optical module are accommodated in the lamp housing, such that light emitted from the light source module enters the optical module;

the point contact member abuts against the inner wall of the lamp housing via point contact, and the side of the point contact member away from the optical module is rollably connected to the inner wall of the lamp housing in any direction, such that the optical module is rotatable relative to the lamp housing to alter the exit direction when the light passes through the optical module.

A luminaire with adjustable illumination angle, comprising a lamp housing, a light source module, an optical module, and an illumination angle adjustment structure for assembling the optical module on the lamp housing;

wherein the light source module is disposed within the lamp housing; the illumination angle adjustment structures are disposed around a peripheral wall of the optical module and connected to the optical module;

the illumination angle adjustment structure comprises a point contact member; the point contact member abuts against an inner wall of the lamp housing via point contact; and sides of the point contact members away from the optical module is rollably connected to the inner wall of the lamp housing in any direction, enabling the optical module to rotate relative to the lamp housing to alter an exit direction of light emitted from the light source module and entering the optical module.

In one embodiment, the point contact member comprises at least three rolling components, the three rolling components being arranged around the peripheral wall of the optical module, sides of the three rolling components away from the optical module are independently rollably connected to the inner wall of the lamp housing in any direction;

each rolling component comprises a carrier, a telescoping member, a spherical roller, and a guiding member connected to the peripheral wall of the optical module; the carrier is the slidably coupled to the guiding member and configured to connect to the optical module; the spherical roller is rollably connected to a side of the carrier away from the optical module; the side of the spherical roller away from the carrier at least partially protrudes beyond the guiding member and abuts against the inner wall of the lamp housing via point contact; the guiding member of each rolling component is provided with a sliding slot extending in a direction parallel to a lengthwise direction of the telescoping member; the telescoping member is accommodated within the sliding slot; ends of the telescoping member respectively abut against a base of the sliding slot and a side of the carrier proximate to the optical module, and the telescoping member is configured to generate an elastic force to press the spherical roller against the inner wall of the lamp housing.

In one embodiment, at least one annular spherical surface is provided on the inner wall of the lamp housing, or a cylindrical inner wall is provided on the inner wall of the lamp housing;

damping protrusions are provided on the inner wall of the lamp housing, auxiliary damping protrusions are sleeved on the spherical roller, the auxiliary damping protrusions cooperates with the damping protrusions to position and fix the spherical roller on the inner wall of the lamp housing;

the damping protrusions and the auxiliary damping protrusions are grid-shaped protrusions; and/or the damping protrusions and auxiliary damping protrusions are silicone protrusions.

Compared with the prior art, the present invention has at least the following advantages. The illumination angle adjustment structure of the present invention allows the point contact members to be arranged around the peripheral wall of the optical module and connected to the optical module. That is, the optical module is connected to the lamp housing through the point contact members, and the point contact members are in point contact with the inner wall of the lamp housing, thereby achieving indirect point contact abutment of the optical module against the lamp housing. In conjunction with the side of the point contact member away from the optical module being rollably connected to the inner wall of the lamp housing in any direction, the point contact member drives the optical module to roll together relative to the inner wall of the lamp housing, thereby enabling the optical module to rotate relative to the light source module in any direction, and achieving 360-degree point-contact rotation of the optical module relative to the light source module. Deflecting the light emitted by the light source module 30 through the optical module, achieves improved smoothness of the 360-degree illumination angle adjustment of the luminaire with adjustable illumination angle. Furthermore, the user can complete the 360-degree illumination angle adjustment of the luminaire with adjustable illumination angle by applying force to the optical module and forcing the point contact member to roll relative to the inner wall of the lamp housing, which significantly improves the convenience of the illumination angle adjustment of the luminaire with adjustable illumination angle.

BRIEF DESCRIPTION OF THE DRAWINGS

In order to more clearly illustrate the technical solutions of the embodiments of the present invention, a brief introduction to the drawings used in the embodiments will be given below. It should be understood that the following drawings only show certain embodiments of the present invention, and therefore should not be considered as a limitation of the scope. For those skilled in the art, other related drawings can be obtained without creative effort based on these drawings.

DESCRIPTION OF THE EMBODIMENTS

In order to facilitate the understanding of the present invention, a more comprehensive description will be provided below with reference to the relevant drawings. The drawings illustrate a preferred embodiment of the present invention. However, the present invention can be implemented in many different forms and is not limited to the embodiments described herein. On the contrary, the purpose of providing these embodiments is to make the disclosure of the present invention more thorough and comprehensive.

It should be noted that when a component is referred to as "fixed to" another component, it can be directly on the other component or there may be an intervening component. When a component is considered to be "connected to" another component, it may be directly connected to the other component or there may be an intervening component. The terms "vertical", "horizontal", "left", "right" and similar expressions used in this document are for illustrative purposes only and do not represent the only possible implementation.

Unless defined otherwise, all technical and scientific terms used herein have the same meaning as commonly understood by one of ordinary skill in the art to which this invention belongs. The terminology used in the specification of the present invention is for the purpose of describing particular embodiments only and is not intended to be limiting. The term(s) used herein "and/or" include any and all combinations of one or more of the associated listed items.

The present application provides a luminaire with adjustable illumination angle. An illumination angle adjustment structure of the luminaire with adjustable illumination angle is used to assemble the optical module to a lamp housing, so that the light emitted from the light source module enters the optical module. Further, relief clearance is maintained for the optical module against the lamp housing and light source module.

In order to better understand the luminaire with adjustable illumination angle of the present application, the illumination angle adjustment structure will be first explained below.

Figure 1:
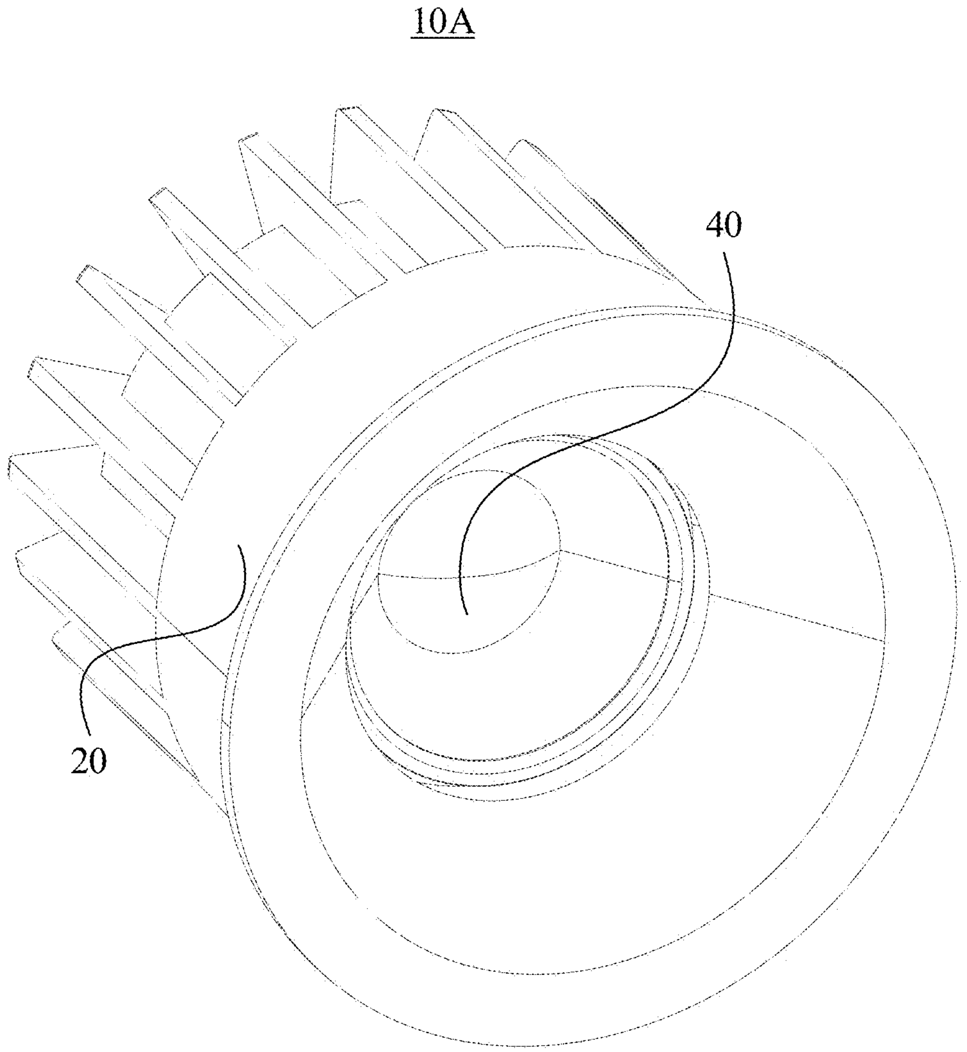
FIG. 1 is a schematic structural diagram of a luminaire with adjustable illumination angle according to an embodiment of the present invention.
Figure 2:
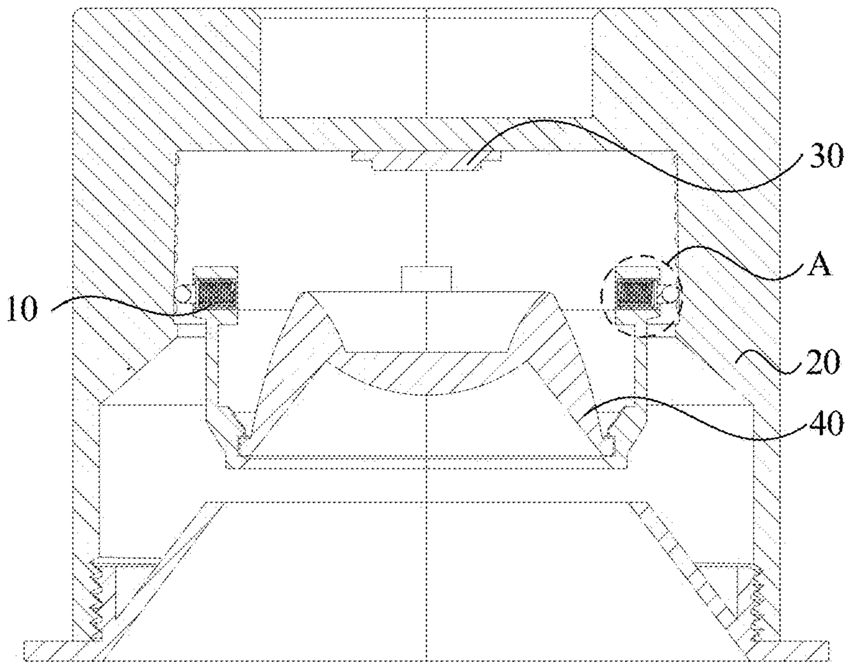
FIG. 2 is a cross-sectional view of the luminaire with adjustable illumination angle shown in FIG. 1.
Figure 3:
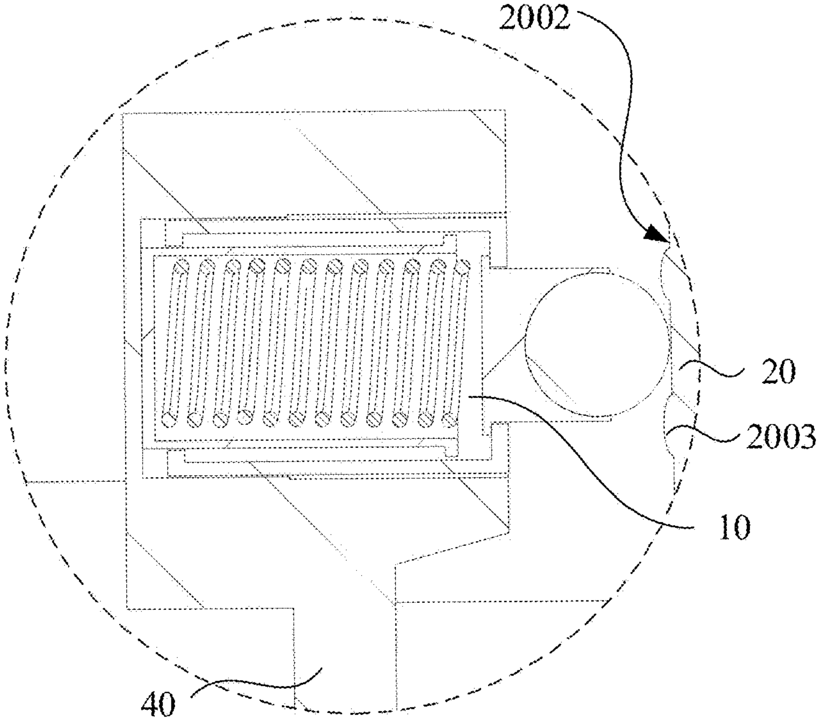
FIG. 3 is a partial enlarged view at A of the luminaire with adjustable illumination angle shown in FIG. 2.
Figure 12:
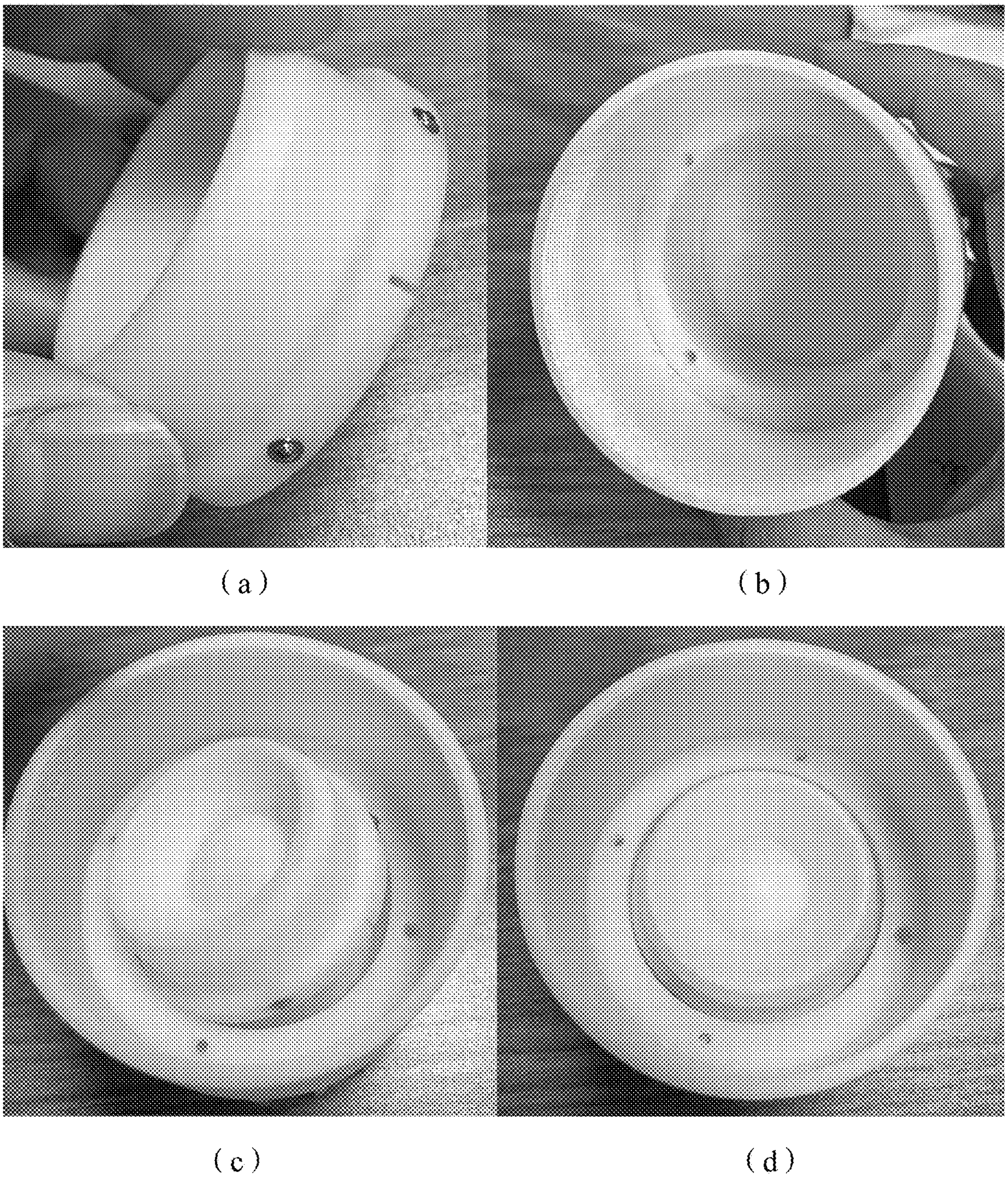
FIG. 12 is a sample of the illumination angle adjustment structure shown in FIG. 10.

Referring to FIG. 1 to FIG. 3, an illumination angle adjustment structure 10 according to an embodiment includes a point contact member 10*a*. Referring to FIG. 12 together, the point contact member 10*a* is disposed around a peripheral wall 41 of an optical module 40 and connected to the optical module 40. The point contact member 10*a* and the optical module 40 are accommodated together in the lamp housing 20. The point contact member 10*a* is in point contact with an inner wall of the lamp housing 20, and one side of the point contact member 10*a* away from the optical module 40 is rollably connected to the inner wall of the lamp housing 20 in any direction, so that the optical module 40 can rotate relative to the lamp housing 20 to alter an exit direction when light passes through the optical module 40.

The illumination angle adjustment structure 10 allows the point contact member 10*a* to be disposed around the peripheral wall 41 of the optical module 40 and connected to the optical module 40. That is, the optical module 40 is connected to the lamp housing 20 through the point contact member 10*a*, and the point contact member 10*a* is in point contact with the inner wall of the lamp housing 20, which achieves an indirect point-contact abutment between the optical module 40 and the lamp housing 20. Cooperating with the side of the point contact member 10*a* away from the optical module 40 being rollably connected to the inner wall of the lamp housing 20 in any direction, the point contact member 10*a* drives the optical module 40 to roll together relative to the inner wall of the lamp housing 20, thereby enabling the optical module 40 to rotate relative to the light source module 30 in any direction, realizing the 360-degree point-contact rotation of the optical module 40 relative to the light source module 30. Deflecting the light emitted by the light source module 30 through the optical module 40, improves the smoothness of the 360-degree adjustment of the illumination angle of the luminaire 10A with adjustable illumination angle. Further, users can complete the 360-degree adjustment of the illumination angle of the luminaire 10A with adjustable illumination angle by applying force to the optical module 40 and forcing the point contact member 10*a* to roll relative to the inner wall of the lamp housing 20, which greatly improves the adjustment convenience of the illumination angle of the luminaire 10A with adjustable illumination angle.

It should be noted that the point contact member can be fixedly connected to the lamp housing, while the connection with the optical module is achieved by abutting.

In order to better understand the luminaire with adjustable illumination angle of the present application, the following further explanation of the luminaire with adjustable illumination angle of the present application is provided in conjunction with the illumination angle adjustment structure.

Referring to FIG. 1 to FIG. 3, the luminaire 10A with adjustable illumination angle according to an embodiment includes a lamp housing 20, a light source module 30, an optical module 40, and the illumination angle adjustment structure 10 of any of the above embodiments. The light source module 30 is disposed inside the lamp housing 20. The point contact member 10*a* is disposed around the peripheral wall 41 of the optical module 40 and connected to the optical module 40, and the point contact member 10*a* and the optical module 40 are accommodated in the lamp housing 20 together, so that the light emitted from the light source module 30 is incident on the optical module 40. The point contact member 10*a* is in point contact with the inner wall of the lamp housing 20, and the side of the point contact member 10*a* away from the optical module 40 is rollably connected to the inner wall of the lamp housing 20 in any direction, so that the optical module 40 can rotate relative to the lamp housing 20 to alter the exit direction when light passes through the optical module 40.

The luminaire 10A with adjustable illumination angle as described above, employs the illumination angle adjustment structure 10, effectively achieving both the convenience and smoothness of illumination angle adjustment for the luminaire 10A with adjustable illumination angle.

It should be noted that the side of the point contact member away from the optical module can be rollably connected to the inner wall of the lamp housing in any direction. This can be understood as follows: the side of the point contact member used to abut against the inner wall of the lamp housing is a spherical surface to allow the entire point contact member to roll relative to the inner wall of the lamp housing in any direction; the point contact member is disposed around the peripheral wall of the optical module, so that the point contact member drives the optical module to roll together relative to the inner wall of the lamp housing, thereby causing the optical module to rotate relative to the light source module in any direction and achieving 360-degree rotation of the optical module relative to the light source module; and the light emitted by the light source module is deflected by the optical module, realizing 360-degree adjustment of the illumination angle of the luminaire.

It should also be noted that, since the point contact member enables the optical module to rotate relative to the light source module in any direction, when the user applies force to the optical module and forces the point contact member to roll relative to the inner wall of the lamp housing, a 360-degree rapid adjustment of the illumination angle of the luminaire can be achieved. This effectively improves the convenience of adjusting the illumination angle of the luminaire. Furthermore, since the point contact member rolls against the inner wall of the lamp housing in a point contact manner, it better achieves the improvement of the smoothness of the illumination angle adjustment of the luminaire.

It should be noted that, since the optical module is constrained within the lamp housing by point contact members and rotates relative to the light source module, that is, the rotation of the optical module is constrained within the lamp housing, the user can better control the relative arrangement of the light incident surface of the optical module and the light source module on the basis of adjusting the rotation angle of the optical module, so as to effectively realize the incidence of light emitted from the light source module to the light incident surface of the optical module. The light further exits through the light exit surface of the optical module, thereby effectively controlling the light output quality of the luminaire with adjustable illumination angle. In other words, when the optical module is rolled and arranged on the inner wall of the lamp housing through point contact members, the rotation angle of the optical module can be effectively controlled by the user, and the propagation direction of the light emitted from the optical module can be fully adjusted, thereby effectively adjusting the illumination angle of the luminaire with adjustable illumination angle.

Figure 4:
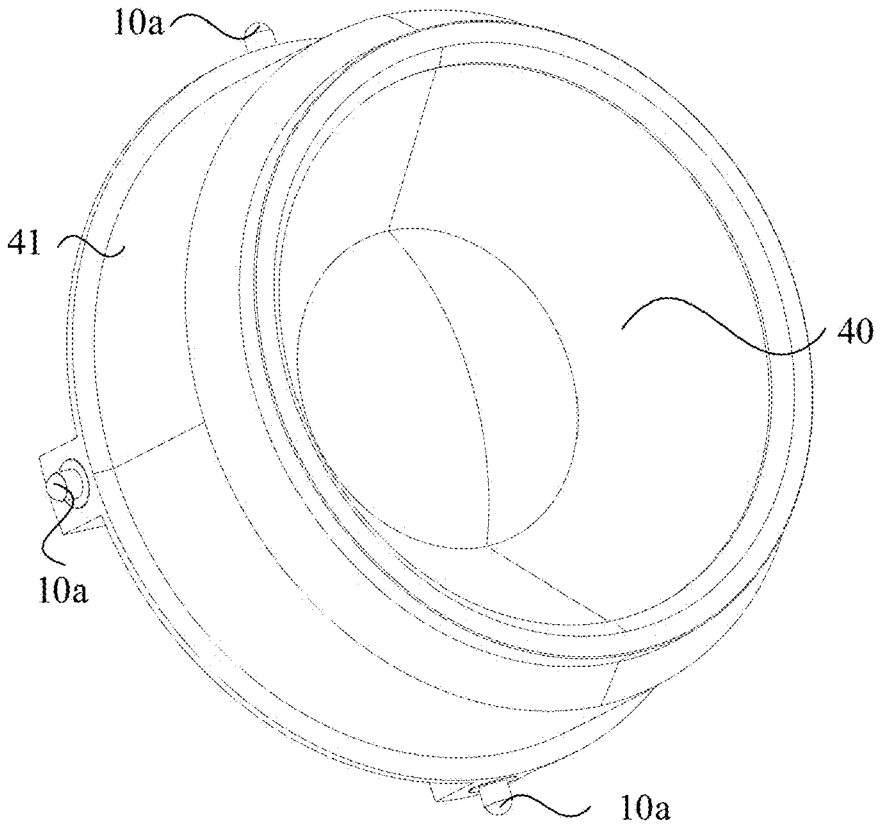
FIG. 4 is a partial view of the luminaire with adjustable illumination angle shown in FIG. 1.
Figure 5:
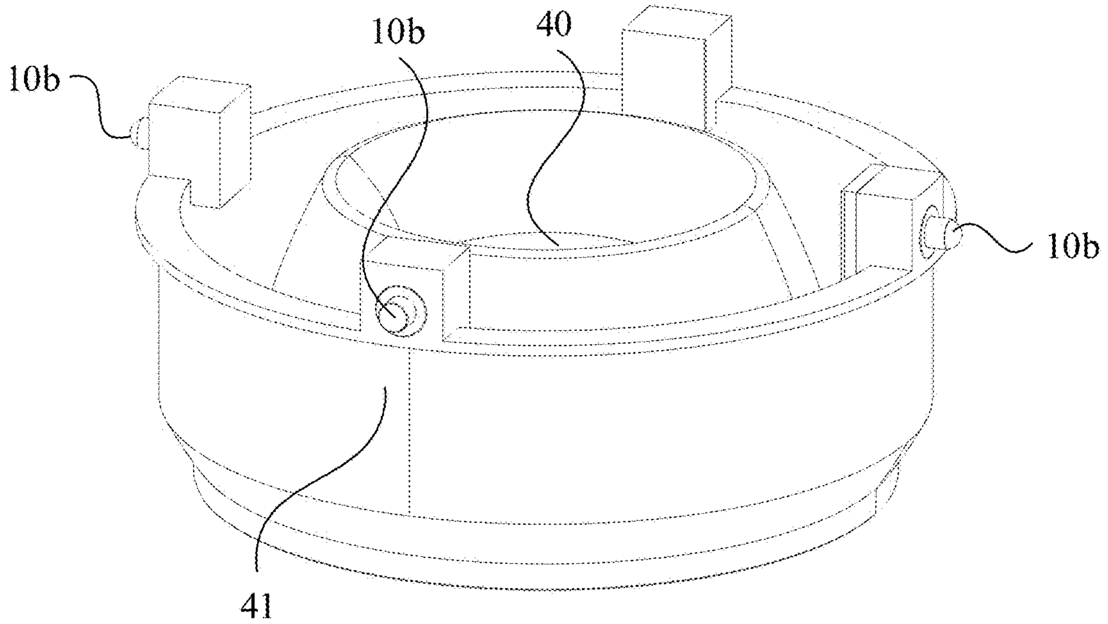
FIG. 5 is another partial view of the luminaire with adjustable illumination angle shown in FIG. 1.

Referring to FIG. 2, FIG. 4, and FIG. 5, the point contact member 10*a* according to one embodiment includes at least three rolling components 10*b*. The three rolling components 10*b* are arranged circumferentially around the optical module 40. Each rolling component 10*b* is connected to the optical module 40, and each rolling component 10*b* is accommodated in the lamp housing 20 and abuts against the inner wall of the lamp housing 20 via point contact. Sides of the three rolling components 10*b* away from the optical module 40 are independently rollably connected to the inner wall of the lamp housing 20 in any direction, so that the optical module 40 can rotate relative to the lamp housing 20. Further, at least three rolling components 10*b* are evenly arranged around the circumference of the optical module 40. It can be understood that the three rolling components 10*b* are evenly arranged around the circumference of the optical module 40, realizing the stable accommodation of the optical module 40 within the lamp housing 20 through the point contact member 10*a*. Furthermore, the side of the three rolling components 10*b* away from the optical module 40 is independently rollably connected to the inner wall of the lamp housing 20 in any direction. That is, each rolling component 10*b* can be rollably connected to the inner wall of the lamp housing 20 in any direction, without interference by the other rolling components 10*b*. For example, one rolling component 10*b* rolls a larger distance towards the light source module 30, while the other rolling components 10*b* roll a smaller distance towards the light source module 30, or one rolling component 10*b* does not roll on the lamp housing. At this time, the optical module 40 as a whole rolls relative to the lamp housing 20 through the point contact member 10*a*, causing the optical module 40 to rotate relative to the light source module 30, thereby achieving the illumination angle adjustment of the luminaire 10A with adjustable illumination angle. Similarly, causing different rolling components 10*b* to roll different distances in different directions can achieve 360-degree illumination angle adjustment of the luminaire 10A with adjustable illumination angle. In addition, each rolling component 10*b* is connected to the inner wall of the lamp housing 20 via point-contact rolling, which has less resistance than point-contact sliding, and further improves the smoothness of the illumination angle adjustment of the luminaire 10A with adjustable illumination angle.

Referring to FIG. 2, FIG. 4, and FIG. 5, the point contact member 10*a* according to another embodiment includes four rolling members 10*b*. The four rolling members 10*b* are arranged circumferentially around the optical module 40. Each rolling component 10*b* is connected to the optical module 40, and each rolling component 10*b* is accommodated in the lamp housing 20 and abuts against the inner wall of the lamp housing 20 via point contact. Sides of the four rolling components 10*b* away from the optical module 40 are independently rollably connected to the inner wall of the lamp housing 20 in any direction, so that the optical module 40 can rotate relative to the lamp housing 20. Further, at least four rolling components 10*b* are evenly arranged around the circumference of the optical module 40. It can be understood that the number of rolling members 10*b* is at least three. When the number of rolling members 10*b* is three, the optical module 40 can be stably snap-fitted on the inner wall of the lamp housing 20. Furthermore, making the number of rolling members 10*b* four allows the user to better adjust the rotation of the optical module 40 on the inner wall of the lamp housing 20 through the rolling members 10*b*, such as the effect of a universal joint. If the number of rolling members 10*b* is greater than four, since the optical module 40 rolls with the inner wall of the lamp housing 20 in a point contact manner through the rolling members 10*b*, the smoothness of the movement of the optical module 40 on the lamp housing 20 remains high even with a larger number of rolling members 10*b*. However, when the number of rolling members 10*b* is large, there are more contact points between the optical module 40 and the inner wall of the lamp housing 20, and the damping of the optical module 40 on the inner wall of the lamp housing 20 is stronger, allowing the user to more accurately achieve the positioning adjustment of the optical module 40.

Figure 7:
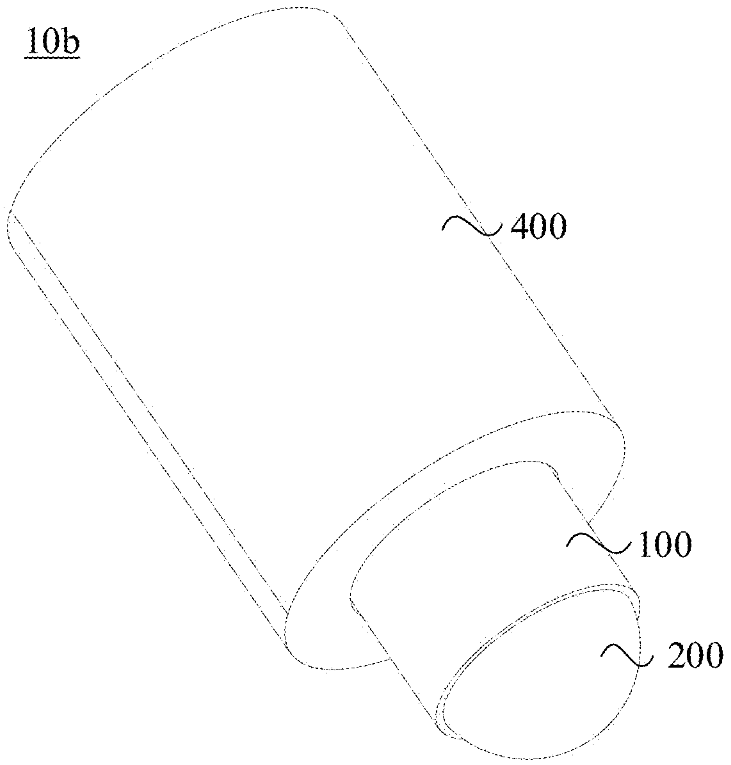
FIG. 7 is a schematic structural diagram of an illumination angle adjustment structure according to an embodiment of the present invention.
Figure 8:
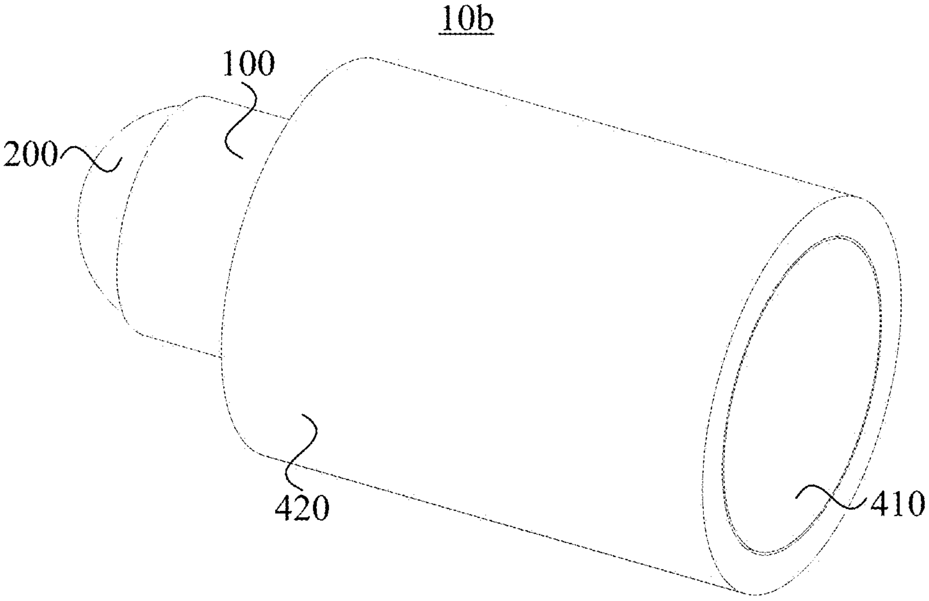
FIG. 8 is another schematic structural diagram of the illumination angle adjustment structure shown in FIG. 7.
Figure 9:
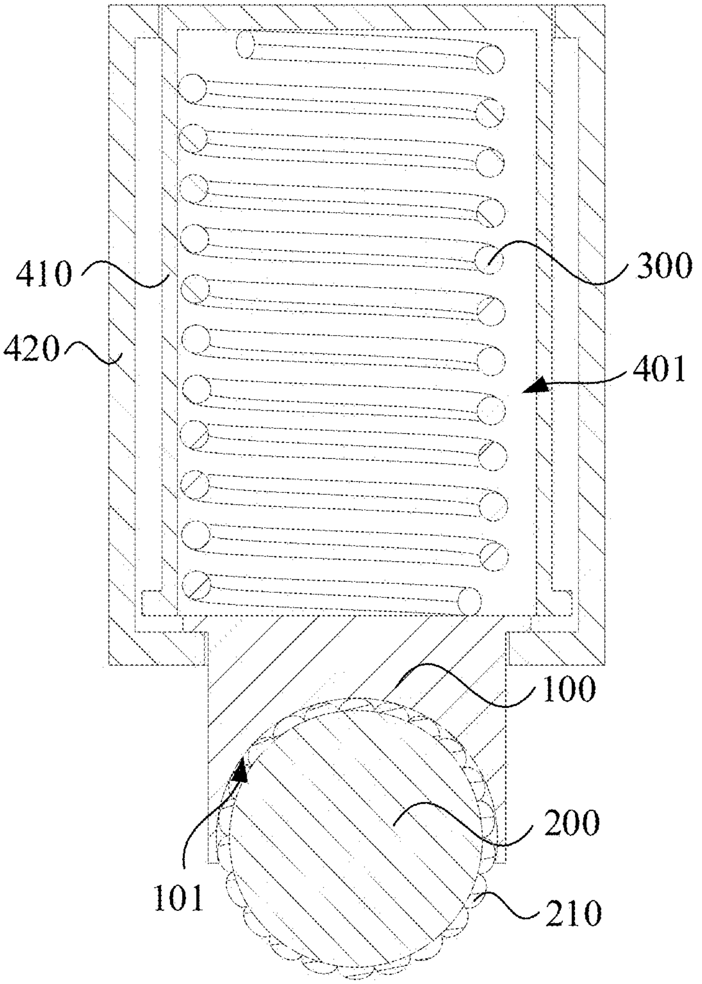
FIG. 9 is a cross-sectional view of the illumination angle adjustment structure shown in FIG. 7.

Referring to FIG. 7 to FIG. 9 together, in one embodiment, each rolling component 10*b* includes a carrier 100 and a spherical roller 200. The carrier 100 is used to connect with the optical module 40, and the spherical roller 200 is rollably connected to a side of the carrier 100 away from the optical module 40. A side of the spherical roller 200 away from the carrier 100 is in point contact with the inner wall of the lamp housing 20. The carriers 100 of each rolling component 10*b* are independently rollably connected to the inner wall of the lamp housing 20 in any direction through the spherical roller 200. Further, the spherical roller 200 is a ball. It can be understood that by arranging the carrier 100 on the circumference of the optical module 40 and connecting it to the optical module 40, the fixing effect of the rolling component 10*b* on the optical module 40 is well achieved. By making the spherical roller 200 rollably connected to the side of the carrier 100 away from the optical module 40, and the side of the spherical roller 200 away from the carrier 100 in point contact with the inner wall of the lamp housing 20, in conjunction with the carrier 100 of each rolling component 10*b* independently rollably connected to the inner wall of the lamp housing 20 in any direction through the spherical roller 200, the carrier 100 is well rollably connected to the inner wall of the lamp housing 20 through the spherical roller 200. This further improves the rolling smoothness of the optical module 40 on the inner wall of the lamp housing 20, thereby further improving the smoothness of the illumination angle adjustment of the luminaire with adjustable illumination angle, and well achieving the rolling arrangement of the optical module 40 relative to the lamp housing 20 through the carriers 100 of each rolling component 10*b*, thereby well achieving the convenient 360-degree illumination angle adjustment of the luminaire with adjustable illumination angle.

Referring to FIG. 7 to FIG. 9, in one embodiment, a rolling groove 101 is provided on the side of the carrier 100 away from the optical module 40. The spherical roller 200 is snapped into the rolling groove 101 and is rollably connected to the carrier 100, which improves the rolling connection stability of the spherical roller 200 on the carrier 100, further improves the rolling stability of the optical module 40 on the inner wall of the lamp housing 20 through the carrier 100, and further improves the stability of the 360-degree illumination angle adjustment of the luminaire with adjustable illumination angle.

Referring to FIG. 7 to FIG. 9, in one embodiment, each rolling component 10*b* further includes a telescoping member 300. One end of the telescoping member 300 is connected to a side of the carrier 100 proximate to the optical module 40, and the other end of the telescoping member 300 is connected to a side of the optical module 40 proximate to the carrier 100. The telescoping member 300 is configured to generate an elastic force to push the spherical roller 200 against the inner wall of the lamp housing 20. It can be understood that the telescoping member 300 is configured to generate the elastic force to push the spherical roller 200 to abut against the inner wall of the lamp housing 20 with a certain pressure. That is, the spherical roller 200 has the ability to adaptively adjust the contact pressure through the elastic force of the telescoping member 300, so that the spherical roller 200 always maintains dynamic and tight contact with the inner wall of the lamp housing 20, which is compatible with a change in distance and assembly tolerance between the spherical roller 200 and the inner wall of the lamp housing 20. This effectively ensures the effective abutment and accommodation of the optical module 40 on the inner wall of the lamp housing 20, that is, it effectively realizes the effective point contact of the optical module 40 on the inner wall of the lamp housing 20 through the point contact member 10*a*, and then realizes the effective rolling setting of the optical module 40 on the inner wall of the lamp housing 20, ensuring the effective 360-degree illumination angle adjustment of the luminaire with adjustable illumination angle.

Referring to FIG. 3 and FIG. 9, in one embodiment, the inner wall of the lamp housing 20 is provided with a cylindrical inner wall 2002. The point contact member 10*a* makes point contact with the cylindrical inner wall 2002, and the side of the point contact member 10*a* away from the optical module 40 is rollably connected to the cylindrical inner wall 2002 in any direction, so that the optical module 40 can rotate relative to the lamp housing 20. It can be understood that, generally, if the optical module 40 is to be rollably arranged on the lamp housing 20, it is required to cause the entire peripheral wall 41 of the optical module 40 to exhibit a spherical surface, with the inner wall of the lamp housing 20 also being spherical, such that effective rolling contact of the optical module 40 along the inner wall of the lamp housing 20 can be achieved. However, this configuration can only fix the distance between the optical module 40 and the light source module 30, thereby constraining the focal length of the luminaire 10A and limiting its applicability across diverse scenarios. Through cooperation with the point contact member 10*a*, the telescoping member 300 generates elastic force to maintain continuous sliding contact between the spherical roller 200 and the inner wall of the lamp housing 20. Consequently, the optical module 40 of the luminaire 10A achieves effective rolling motion along the cylindrical inner surface 2002, thereby realizing the variability of the focal length of the luminaire 10A with adjustable illumination angle, and improving the universality of the luminaire 10A with adjustable illumination angle. Further, without adjusting the lamp housing 20 and the light source module 30, or adding auxiliary structures in the lamp housing 20 to realize the relatively rollable arrangement of the optical module 40, the relatively rollable arrangement of the optical module 40 on the inner wall of the lamp housing 20 is directly achieved through the point contact member 10*a*. That is, it can be considered that structural elements are reduced, but the relatively rollable arrangement of the optical module 40 on the light source component can still be realized.

In one embodiment, the illumination angle adjustment structure includes a plurality of point contact members, and the carriers of the point contact members are linearly arranged in a direction intersecting a plane where the circumference of the optical module is located. Further, the plurality of point contact members are two or more point contact members. It can be understood that a plurality of point contact members are arranged in a direction intersecting a plane where the circumference of the optical module is located. This configuration enhances mechanical constraint between the optical module and the inner wall of the lamp housing along the longitudinal dimension, thereby significantly improving the accommodation stability of the optical module on the inner wall of the lamp housing, effectively reducing the deviation in the rolling angle control of the optical module caused by uneven force during the relative rolling process, and improving the control precision of the 360-degree illumination angle adjustment of the luminaire with adjustable illumination angle.

Figure 6:
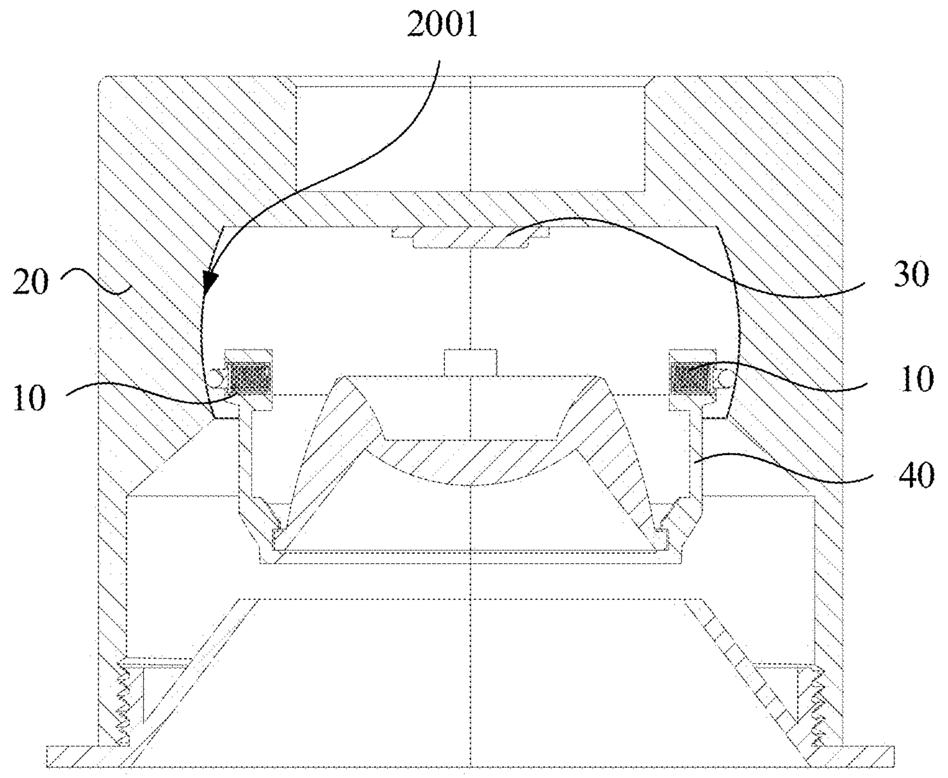
FIG. 6 is a cross-sectional view of a luminaire with adjustable illumination angle according to another embodiment of the present invention.

Referring to FIG. 6 and FIG. 9, in one embodiment, the inner wall of the lamp housing 20 is provided with at least one annular spherical surface 2001, the point contact member 10*a* is in point contact with the annular spherical surface 2001, and the side of the point contact member 10*a* away from the optical module 40 is rollably connected to the annular spherical surface 2001 in any direction, so that the optical module 40 can rotate relative to the lamp housing 20. It can be understood that, by providing at least one annular spherical surface 2001 on the inner wall of the lamp housing 20, when the optical module 40 can roll relative to the lamp housing 20 through the point contact member 10*a*, the spherical rolling member 200 keeps abutting against the annular spherical surface 2001 through the telescoping member 300, the rolling center of the optical module 40 remains unchanged, which can better ensure the light output effect of the luminaire 10A with adjustable illumination angle. It can also be understood that, since different illumination effects will be produced when the distance between the optical module 40 and the light source module 30 of the luminaire 10A with adjustable illumination angle changes, specifically manifested as changes in the illumination range and beam shape, the closer the distance, the smaller the beam angle and the smaller the illumination range; conversely, the farther the distance, the larger the beam angle and the larger the illumination range. Therefore, in order to realize the adjustability of the focal length of the luminaire 10A with adjustable illumination angle on the basis of ensuring the light output effect of the luminaire 10A with adjustable illumination angle. Further, the inner wall of the lamp housing is provided with a plurality of annular spherical surfaces, the plurality of annular spherical surfaces are linearly arranged, the point contact member is in point contact with any annular spherical surface, and the side of the point contact member away from the optical module is rollably connected to any annular spherical surface in any direction, so that the optical module can rotate relative to the lamp housing. Further, the plurality of annular spherical surfaces are two or more annular spherical surfaces. It can be understood that, due to the arrangement of the point contact members, the stable arrangement of the optical module on the annular spherical surface can be better realized under the action of the elastic force of the telescoping member, and when an external force is applied to the optical module, the optical module can be better rolled from one annular spherical surface to another annular spherical surface. In this way, the adjustment of the focal length of the lamp is realized when the optical module is rolled and arranged on different annular spherical surfaces, which effectively improves the versatility of the lamp.

In one embodiment, the inner wall of the lamp housing 20 is provided with damping protrusions 2003, and the point contact member 20*a* is in point contact with the damping protrusions 2003, as shown in FIG. 2 and FIG. 3. Further, the damping protrusions 2003 are arranged on the annular spherical surface 2001 and the cylindrical inner wall 2002. The damping protrusions 2003 are mesh-like protrusions. The damping protrusions 2003 are silicone protrusions. The spherical roller 200 of each rolling component 20*b* of the point contact member 20*a* abuts against the damping protrusions 2003, effectively improving the rolling positioning and limiting stability of the optical module 40 on the inner wall of the lamp housing 20. The damping protrusions 2003 are located on the annular spherical surface 2001. The damping protrusions 2003 are located on the cylindrical inner wall 2002.

In one embodiment, auxiliary damping protrusions 210 are sleeved on the spherical roller 200, as shown in FIG. 9. Further, the auxiliary damping protrusions 210 are mesh-like protrusions. The auxiliary damping protrusions 210 are silicone protrusions. A side of the auxiliary damping protrusions 210 away from the spherical roller 200 together forms a rolling spherical surface, so as to roll smoothly on the carrier 100. The auxiliary damping protrusions 210 cooperate with the damping protrusions 2003 to effectively realize the effective positioning and fixing of the spherical roller 200 on the inner wall of the lamp housing 20. In particular, when the spherical roller 200 is rolling and arranged on the cylindrical inner wall 2002, the spherical roller 200 is easily further slid from the inner wall of the lamp housing 20 due to the elastic tension of the telescoping member 300, which makes it difficult for the spherical roller 200 to be stably limited and fixed on the inner wall of the lamp housing 20. The auxiliary damping protrusions 210 cooperates with the damping protrusions 2003 to effectively realize the effective positioning and fixing of the spherical roller 200 on the cylindrical inner wall 2002, thereby realizing the stable positioning of the optical module 40 relative to the light source module 30 when the illumination angle adjustment structure 10 is used in a luminaire with adjustable illumination angle.

Figure 10:
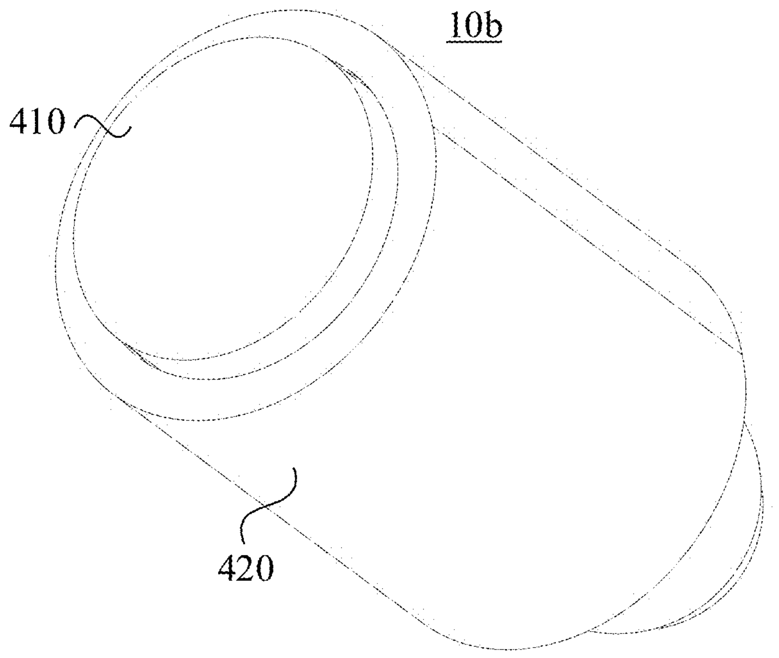
FIG. 10 is a diagram illustrating the state of use of the illumination angle adjustment structure shown in FIG. 7.
Figure 11:
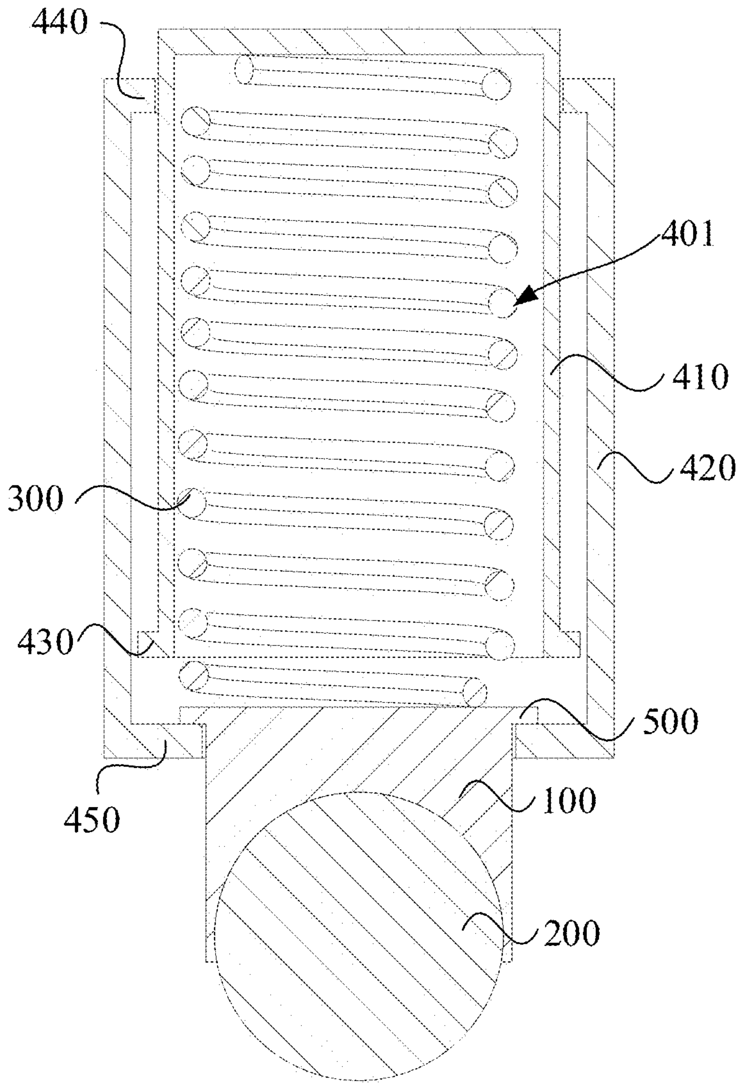
FIG. 11 is a cross-sectional view of the illumination angle adjustment structure shown in FIG. 10.

Referring to FIG. 10 to FIG. 11, in one embodiment, each rolling component 10*b* further includes a guiding member 400. The guiding member 400 is connected to the peripheral wall 41 of the optical module 40, and the side of the spherical roller 200 away from the carrier 100 at least partially protrudes beyond the guiding member 400. Furthermore, the carrier 100 is slidably connected to the guiding member 400, and one end of the telescoping member 300 proximate to the optical module 40 is connected to the optical module 40 through the guiding member 400. The guiding member 400 is configured to allow the telescoping member 300 to extend and contract inward, so that the spherical roller 200 can slide relative to the guiding member 400 in a direction toward or away from the optical module 40. It can be understood that the telescoping member 300 is a structure that can generate elastic force, such as a metal elastic member and a polymer elastic member, especially a spring. During the rolling process, the telescoping member 300 is prone to bending and deflection, which will greatly affect the relative rolling stability of the optical module 40 on the inner wall of the lamp housing 20. Therefore, the carrier 100 is slidably connected to the guiding member 400, and the telescoping member 300 retracts within the guiding member 400, so that the guiding member 400 restricts the telescoping member 300 to reduce the bending and deflection of the telescoping member 300. Thus, the rolling stability of the optical module 40 relative to the inner wall of the lamp housing 20 is improved.

Referring to FIG. 10 to FIG. 11, in one embodiment, the guiding member 400 of each rolling member 10*b* is provided with a sliding slot 401 with an extending direction the same as a length direction of the telescoping member 300. The telescoping member 300 is accommodated in the sliding slot 401, and the carrier 100 is at least partially engaged with the sliding slot 401 and is in sliding connection with walls of the sliding slot 401. The two ends of the telescoping member 300 abut against a base of the sliding slot 401 and the side of the carrier 100 proximate to the optical module 40, respectively, which better realizes the stable elastic extension and contraction of the telescoping member 300 in the guiding member 400.

Referring to FIG. 10 to FIG. 11, in one embodiment, the guiding member 400 of each rolling component 10*b* includes a mount base 410 and a telescopic sliding sleeve 420. The mount base 410 is connected to the peripheral wall 41 of the optical module 40. The telescopic sliding sleeve 420 is sleeved on the mount base 410 and is slidably connected to the mount base 410. A sliding direction of the mount base 410 is the same as the length direction of the telescoping member 300. The telescopic sliding sleeve 420 protrudes at least partially from a side of the mount base 410 away from the optical module 40, and the spherical roller 200 protrudes at least partially beyond the telescopic sliding sleeve 420. Furthermore, one end of the telescoping member 300 proximate to the optical module 40 is connected to the optical module 40 through the mount base 410, and both the mount base 410 and the telescopic sliding sleeve 420 are configured to allow the telescoping member 300 to extend and contract inward. Furthermore, when the telescoping member 300 is telescopically arranged on the mount base 410, the carrier 100 is slidably connected to the mount base 410; when the telescoping member 300 is telescopically arranged on the mount base 410 and the telescopic sliding sleeve 420, the carrier 100 slides away from the mount base 410, and the carrier 100 is locked on the telescopic sliding sleeve 420 and further pushes the telescopic sliding sleeve 420 to slide in a direction away from the optical module 40. It can be understood that, due to the limited space inside the lamp housing 20, in order to better improve the light output effect of the luminaire with adjustable illumination angle, the optical module 40 needs to more completely block the light exit port of the lamp housing 20. However, in order to better adapt the optical module 40 to the use on the cylindrical inner wall 2002, a telescopic amount of the point contact member 10*a* needs to be large. In this way, when the optical module 40 rolls at a large angle relative to the lamp housing 20, the point contact member 10*a* can effectively abut against the inner wall of the lamp housing 20. The telescopic amount of the point contact member 10*a* depends on the telescopic range of the telescoping member 300, i.e., the length of the guiding member 400. However, a longer guiding member 400 will affect the light output effect of the luminaire with adjustable illumination angle. Therefore, in order for the luminaire with adjustable illumination angle to be compatible with a better light output effect and suitable for the rolling abutment stability when the optical module 40 rolls at a large angle relative to the lamp housing 20, the telescopic sliding sleeve 420 is sleeved on the mount base 410 and is slidably connected to the mount base 410. The sliding direction of the mount base 410 is the same as the length direction of the telescoping member 300, that is, the guiding member 400 is also set as a telescopic structure, and the carrier 100 realizes the driving sliding of the telescopic sliding sleeve 420, which better realizes the increase of a telescopic range of the telescoping member 300 by using a smaller space. Furthermore, on the basis of allowing the optical module 40 to block more of the light output port of the lamp housing 20, that is, on the basis of ensuring the light output effect of the luminaire with adjustable illumination angle, the relative rolling abutment stability of the optical module 40 on the inner wall of the lamp housing 20 is improved. Furthermore, the sliding slots 401 are respectively located on the mount base 410 and the telescopic sliding sleeve 420, and a depth of the sliding slots 401 changes through the mutual sliding of the mount base 410 and the telescopic sliding sleeve 420.

Refer to FIG. 10 to FIG. 11, in one embodiment, a first stopper 430 is protrudingly provided on the outer wall of the mount base 410. The first stopper 430 is located on the side of the mount base 410 away from the optical module 40. Furthermore, a second stopper 440 is protrudingly provided on the inner wall of the telescopic sliding sleeve 420. The second stopper 440 is located on a side of the telescopic sliding sleeve 420 proximate to the optical module 40. Furthermore, when the telescoping member 300 is telescopically arranged in the mount base 410 and the telescopic sliding sleeve 420, the carrier 100 pushes the telescopic sliding sleeve 420 to slide in a direction away from the optical module 40 until a side of the first stopper 430 proximate to the optical module 40 abuts against a side of the second stopper 440 away from the optical module 40, thereby preventing the telescopic sliding sleeve 420 from sliding off the mount base 410.

Referring to FIG. 10 to FIG. 11, in one embodiment, a third stopper 500 is protrudingly provided on the outer wall of the carrier 100, and the third stopper 500 is located on the side of the carrier 100 proximate to the optical module 40. Further, a fourth stopper 450 is protrudingly provided on the inner wall of the telescopic sliding sleeve 420, and the fourth stopper 450 is located on the side of the telescopic sliding sleeve 420 away from the optical module 40. Further, when the telescoping member 300 is telescopically arranged in the mount base 410 and the telescopic sliding sleeve 420, the side of the third stopper 500 away from the optical module 40 abuts against a side of the fourth stopper 450 proximate to the optical module 40, which better ensures that the carrier 100 can better drive the telescopic sliding sleeve 420 to slide in the direction away from the optical module 40 when sliding in the direction away from the optical module 40.

In one embodiment, the elastic force generated by the telescoping member of at least one rolling component is different from the elastic force generated by the telescoping members of the remaining rolling components. Furthermore, the inner wall of the lamp housing is provided with a cylindrical inner wall, the spherical roller is in point contact with the cylindrical inner wall, and a side of the spherical roller away from the carrier is rollably connected to the cylindrical inner wall in any direction, so that the optical module can rotate relative to the lamp housing. It can be understood that when the optical module can roll relative to the lamp housing through the point contact member, if the inner wall of the lamp housing is a cylindrical inner wall, and the elastic force generated by the telescoping members is the same, a position of an axis of the optical module will change when rolling, which will affect the formation position and the light output effect of the spot of the luminaire. Therefore, the elastic force generated by the telescoping member of at least one rolling component is different from the elastic force generated by the telescoping members of the remaining rolling components. The adjustment of the number of telescoping members with different elastic forces and the adjustment of the elastic force difference value need to be adjusted according to the optical design based on the light exit width of the lamp housing and the type of optical module. This will not be discussed here, but making the elastic force generated by the telescoping member of at least one rolling component different from the elastic force generated by the telescoping members of the remaining rolling components can realize the position of the axis of the optical module during the rolling process relative to the lamp housing, thereby better ensuring the light output effect of the luminaire.

In one embodiment, the optical module includes a lens. Further, the optical module is a TIR lens. The lens is connected to the point contact member via a lens mount. The lens mount is connected to the telescoping member. The lens mount is connected to the guiding member. The lens mount is connected to the mount base.

In one embodiment, the light source module includes an LED light.

Compared to the prior art, the present invention has at least the following advantages.

The illumination angle adjustment structure 10 of the present invention allows the point contact members **10*a* to be arranged around the peripheral wall 41 of the optical module 40 and connected to the optical module 40. That is, the optical module 40 is connected to the lamp housing 20 through the point contact members 10*a*, and the point contact members 10*a* are in point contact with the inner wall of the lamp housing 20, thereby achieving indirect point contact abutment of the optical module 40 against the lamp housing 20. In conjunction with the side of the point contact member 10*a* away from the optical module 40 being rollably connected to the inner wall of the lamp housing 20 in any direction, the point contact member 10*a* drives the optical module 40 to roll together relative to the inner wall of the lamp housing 20, thereby enabling the optical module 40 to rotate relative to the light source module 30 in any direction, and achieving 360-degree point-contact rotation of the optical module 40 relative to the light source module 30. Deflecting the light emitted by the light source module 30 through the optical module 40, achieves improved smoothness of the 360-degree illumination angle adjustment of the luminaire 10A with adjustable illumination angle. Furthermore, the user can complete the 360-degree illumination angle adjustment of the luminaire 10A with adjustable illumination angle by applying force to the optical module 40 and forcing the point contact member 10*a* to roll relative to the inner wall of the lamp housing 20, which significantly improves the convenience of the illumination angle adjustment of the luminaire 10**A with adjustable illumination angle.

The above embodiments only express several implementation methods of the present invention, and the descriptions are relatively specific and detailed, but they should not be understood as limitations on the scope of the invention patent. It should be pointed out that, for those of ordinary skill in the art, several variations and improvements can still be made without departing from the concept of the present invention, and these all fall within the scope of protection of the present invention. Therefore, the scope of protection of the present invention patent shall be subject to the appended claims.

What is claimed is:

1. An illumination angle adjustment structure for assembling an optical module on a lamp housing, enabling light emitted from the light source module to enter the optical module, wherein the illumination angle adjustment structure comprises a point contact member;

the point contact member is disposed around a peripheral wall of the optical module and connected to the optical module; the point contact member and the optical module are accommodated in the lamp housing; the point contact member abuts against an inner wall of the lamp housing via point contact; and a side of the point contact member away from the optical module is rollably connected to the inner wall of the lamp housing in any direction, enabling the optical module to rotate relative to the lamp housing to alter an exit direction of the light passing through the optical module;

wherein the point contact member comprises at least three rolling components, the three rolling components being arranged around the peripheral wall of the optical module; each rolling component is connected to the optical module, accommodated in the lamp housing, and abuts against the inner wall of the lamp housing via point contact; and sides of the three rolling components away from the optical module are independently rollably connected to the inner wall of the lamp housing in any direction, enabling the optical module to rotate relative to the lamp housing;

wherein each rolling component comprises a carrier and a spherical roller; the carrier is configured to connect to the optical module; the spherical roller is rollably connected to a side of the carrier away from the optical module; and the side of the spherical roller away from the carrier abuts against the inner wall of the lamp housing via point contact; the carrier of each rolling component is independently rollably connected to the inner wall of the lamp housing in any direction via the spherical roller;

wherein each rolling component comprises a telescoping member; one end of the telescoping member is connected to a side of the carrier proximate to the optical module, and the other end of the telescoping member is connected to a side of the optical module proximate to the carrier; and the telescoping member is configured to generate an elastic force to press the spherical roller against the inner wall of the lamp housing;

wherein each rolling component comprises a guiding member connected to the peripheral wall of the optical module; the side of the spherical roller away from the carrier at least partially protrudes beyond the guiding member;

the carrier is slidably coupled to the guiding member; an end of the telescoping member proximate to the optical module is connected to the optical module via the guiding member; and the guiding member is configured to permit telescopic motion of the telescoping member, enabling the spherical roller to slide relative to the guiding member toward or away from the optical module.

2. The illumination angle adjustment structure according to claim 1, wherein at least one annular spherical surface is provided on the inner wall of the lamp housing; the point contact member abuts against the annular spherical surface via point contact, and the side of the point contact member away from the optical module is rollably connected to the annular spherical surface in any direction, enabling the optical module to rotate relative to the lamp housing.

3. The illumination angle adjustment structure according to claim 1, wherein a plurality of annular spherical surfaces are provided on the inner wall of the lamp housing, the plurality of annular spherical surfaces being linearly arranged; the point contact member abuts against any one of the annular spherical surfaces via point contact; and the side of the point contact member away from the optical module is rollably connected to any one of the annular spherical surfaces in any direction, enabling the optical module to rotate relative to the lamp housing.

4. The illumination angle adjustment structure according to claim 1, wherein a cylindrical inner wall is provided on the inner wall of the lamp housing; the point contact member abuts against the cylindrical inner wall via point contact; and the side of the point contact member away from the optical module is rollably connected to the cylindrical inner wall in any direction, enabling the optical module to rotate relative to the lamp housing.

5. The illumination angle adjustment structure according to claim 1, wherein damping protrusions are provided on the inner wall of the lamp housing; and the point contact member abuts against the damping protrusions via point contact.

6. The illumination angle adjustment structure according to claim 5, wherein the damping protrusions are grid-shaped protrusions; and/or the damping protrusions are silicone protrusions.

7. The illumination angle adjustment structure according to claim 1, wherein the point contact member comprises four rolling components arranged around the peripheral wall of the optical module; each rolling component is connected to the optical module, accommodated in the lamp housing, and abuts against the inner wall of the lamp housing via point contact; and sides of the four rolling components away from the optical module are independently rollably connected to the inner wall of the lamp housing in any direction, enabling the optical module to rotate relative to the lamp housing.

8. The illumination angle adjustment structure according to claim 1, wherein a rolling groove is provided on the side of the carrier away from the optical module; and the spherical roller is snapped into the rolling groove and rollably connected to the carrier.

9. The illumination angle adjustment structure according to claim 1, wherein the guiding member of each rolling component is provided with a sliding slot extending in a direction parallel to a lengthwise direction of the telescoping member; the telescoping member is accommodated within the sliding slot; the carrier is at least partially snapped into the sliding slot and slidably connected to walls of the sliding slot; and both ends of the telescoping member respectively abut against a base of the sliding slot and the side of the carrier proximate to the optical module.

10. The illumination angle adjustment structure according to claim 1, wherein the guiding member of each rolling component comprises a mount base and a telescopic sliding sleeve, the mount base is connected to the peripheral wall of the optical module, the telescopic sliding sleeve is slidably coupled to the mount base and telescopically movable relative thereto; a sliding direction of the mount base is parallel to the lengthwise direction of the telescoping member; the telescopic sliding sleeve at least partially protrudes beyond a side of the mount base away from the optical module; the spherical roller at least partially protrudes beyond the telescopic sliding sleeve;

the end of the telescoping member proximate to the optical module is connected to the optical module via the mount base; both the mount base and the telescopic sliding sleeve are configured to permit telescopic motion of the telescoping member;

when the telescoping member is telescopically disposed within the mount base, the carrier is slidably connected to the mount base; and when the telescoping member is telescopically disposed within both the mount base and the telescopic sliding sleeve, the carrier slides away from the mount base, engages with the telescopic sliding sleeve, and drives the telescopic sliding sleeve to slide away from the optical module.

11. The illumination angle adjustment structure according to claim 10, wherein a first stopper protrudes from an outer wall at the side of the mount base away from the optical module; a second stopper protrudes from an inner wall at a side of the telescopic sliding sleeve proximate to the optical module; when the telescoping member is telescopically disposed within both the mount base and the telescopic sliding sleeve, the carrier drives the telescopic sliding sleeve to slide away from the optical module until a side of the first stopper proximate to the optical module abuts against a side of the second stopper away from the optical module; and/or a third stopper protrudes from an outer wall at the side of the carrier proximate to the optical module; a fourth stopper protrudes from the inner wall at a side of the telescopic sliding sleeve away from the optical module; when the telescoping member is telescopically disposed within both the mount base and the telescopic sliding sleeve, a side of the third stopper away from the optical module abuts against a side of the fourth stopper proximate to the optical module.

12. The illumination angle adjustment structure according to claim 1, wherein the elastic force generated by the telescoping member of at least one rolling component differs from that generated by the telescoping members of the remaining rolling components;

a cylindrical inner wall is provided on the inner wall of the lamp housing; the spherical roller abuts against the cylindrical inner wall via point contact; and the side of the spherical roller away from the carrier is rollably connected to the cylindrical inner wall in any direction, enabling the optical module to rotate relative to the lamp housing.

13. A luminaire with adjustable illumination angle, comprising a lamp housing, a light source module, an optical module, and the illumination angle adjustment structure according to claim 1;

wherein the light source module is disposed within the lamp housing;

the point contact member is disposed around a peripheral wall of the optical module and connected to the optical module, and both the point contact member and the optical module are accommodated in the lamp housing, such that light emitted from the light source module enters the optical module;

the point contact member abuts against the inner wall of the lamp housing via point contact, and the side of the point contact member away from the optical module is rollably connected to the inner wall of the lamp housing in any direction, such that the optical module is rotatable relative to the lamp housing to alter the exit direction when the light passes through the optical module.

14. A luminaire with adjustable illumination angle, comprising a lamp housing, a light source module, an optical module, and an illumination angle adjustment structure for assembling the optical module on the lamp housing;

wherein the light source module is disposed within the lamp housing; the illumination angle adjustment structures are disposed around a peripheral wall of the optical module and connected to the optical module;

the illumination angle adjustment structure comprises a point contact member; the point contact member abuts against an inner wall of the lamp housing via point contact; and sides of the point contact members away from the optical module is rollably connected to the inner wall of the lamp housing in any direction, enabling the optical module to rotate relative to the lamp housing to alter an exit direction of light emitted from the light source module and entering the optical module;

the point contact member comprises at least three rolling components, the three rolling components being arranged around the peripheral wall of the optical module, sides of the three rolling components away from the optical module are independently rollably connected to the inner wall of the lamp housing in any direction;

each rolling component comprises a carrier, a telescoping member, a spherical roller, and a guiding member connected to the peripheral wall of the optical module; the carrier is the slidably coupled to the guiding member and configured to connect to the optical module; the spherical roller is rollably connected to a side of the carrier away from the optical module; the side of the spherical roller away from the carrier at least partially protrudes beyond the guiding member and abuts against the inner wall of the lamp housing via point contact; the guiding member of each rolling component is provided with a sliding slot extending in a direction parallel to a lengthwise direction of the telescoping member; the telescoping member is accommodated within the sliding slot; ends of the telescoping member respectively abut against a base of the sliding slot and a side of the carrier proximate to the optical module, and the telescoping member is configured to generate an elastic force to press the spherical roller against the inner wall of the lamp housing.

15. The luminaire with adjustable illumination angle according to claim 14, wherein at least one annular spherical surface is provided on the inner wall of the lamp housing, or a cylindrical inner wall is provided on the inner wall of the lamp housing;

damping protrusions are provided on the inner wall of the lamp housing, auxiliary damping protrusions are sleeved on the spherical roller, the auxiliary damping protrusions cooperates with the damping protrusions to position and fix the spherical roller on the inner wall of the lamp housing;

the damping protrusions and the auxiliary damping protrusions are grid-shaped protrusions; and/or the damping protrusions and auxiliary damping protrusions are silicone protrusions.

* * * * *